Aug. 23, 1960   D. F. HASTINGS ET AL   2,950,420
APPARATUS FOR CONTROLLING THE POSITION OF A DISPLACEABLE
MEMBER TO INDICATE THE SPEED OF AN ENGINE
WITHIN PREDETERMINED RANGES
Filed March 7, 1955
FIG. 1
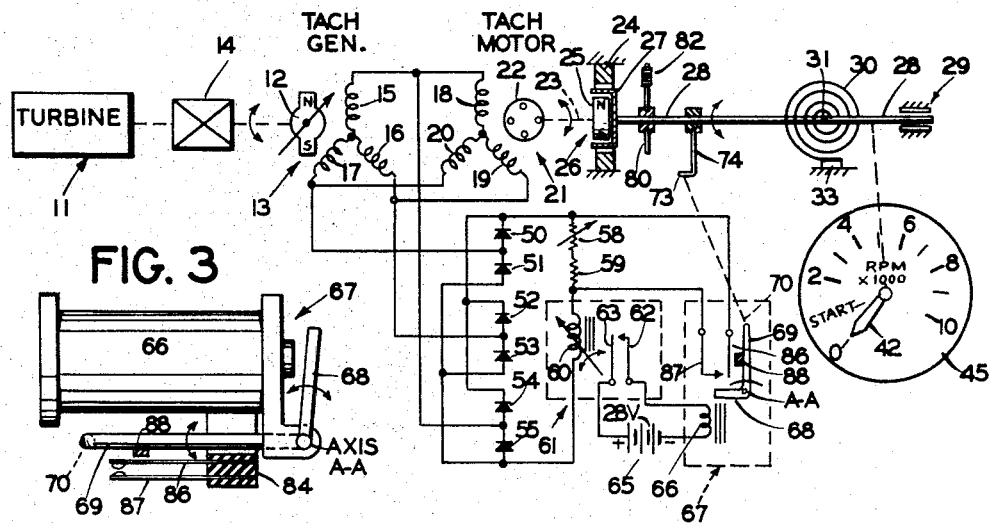
FIG. 3
FIG. 2
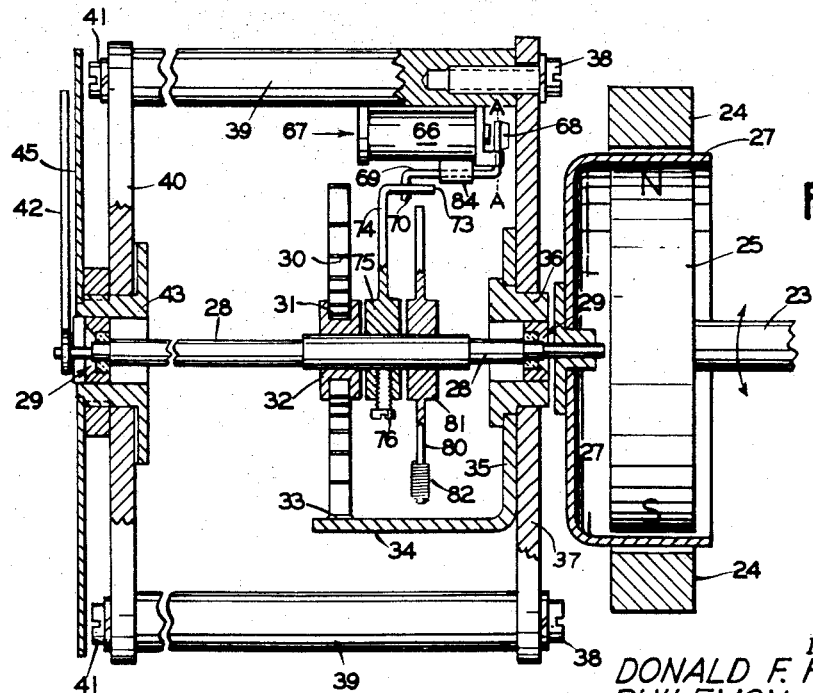
INVENTORS
DONALD F. HASTINGS
PHILEMON A. WALLACE
BY Tyler & Roundy
ATTORNEY United States Patent Office 2,950,420
Patented Aug. 23, 1960

2,950,420

APPARATUS FOR CONTROLLING THE POSITION OF A DISPLACEABLE MEMBER TO INDICATE THE SPEED OF AN ENGINE WITHIN PREDETERMINED RANGES

Donald F. Hastings, Suffern, N.Y., and Philemon A. Wallace, Bloomfield, N.J., assignors to The Bendix Corporation, a corporation of Delaware Filed Mar. 7, 1955, Ser. No. 492,673

8 Claims. (Cl. 317—5)

This invention relates to control apparatus and particularly to control apparatus for sensing or indicating the value of a condition. The invention relates especially to tachometer arrangements or similar apparatus for indicating the speed of rotation of a device such as a gas-turbine engine.

In one conventional remote-indicating aircraft tachometer system for measuring the speed of rotation of the output shaft of a rotating device such as a turbine engine there is provided a tachometer generator in the form of a three-phase synchronous generator having its rotor driven by the turbine at a speed equal to or at least proportional to the turbine speed. The three-phase output windings of the generator are electrically connected back-to-back to the corresponding three-phase field windings of a remote three-phase synchronous motor which is the tachometer motor. The rotor of the motor is mechanically coupled to drive the input element of a slip-coupling device such as a drag-magnet device having its torque-developing output element coupled to a spring-biased shaft to displace the shaft angularly as a function of the speed of the motor. The angular position of the shaft controls the angular position of a pointer associated with a dial calibrated to indicate engine speed. When the generator reaches the rated synchronous speed for the system the motor rotates so as to synchronize or "lock-in" at the same speed as the generator and the torque developed by the output element of the drag-magnet device then overcomes the spring bias on the shaft to displace the pointer to a predetermined angular position or "start" position which indicates to the operator that the ignition for the engine system should be turned on.

Certain troublesome limitations occur in the operation of such a system, for a given tachometer generator and motor with its rated synchronous speed. The first indication that the operator is able to obtain from the pointer showing that the ignition system should be turned on occurs only when the engine has attained a relatively high speed corresponding to the relatively high related synchronous speed of the motor, since the motor does not begin rotation to cause movement of the pointer from zero to "start" position until the generator reaches the synchronous speed. A problem is created in that there are many turbine engine systems particularly on military aircraft which now require for safe and proper engine operation that the pilot turn on the ignition for each engine while it is still rotating at a relatively low speed considerably below the engine speed corresponding to the rated synchronous speed of the tachometer generator and motor. For a given turbine and tachometer generator and motor arrangement with its rated synchronous speed, it will thus be seen that when the engine has attained such low "start" speed the conventional system is unable to alert the pilot to turn on the ignition, since the pointer will not move from zero to "start" position until the engine is turning much faster at a speed sufficient to drive the generator at the synchronous speed. Thus, the pilot is warned too late that the ignition should be turned on.

Moreover, another difficulty exists in conventional systems which have the rated synchronous speed corresponding to the engine "start" speed. In practice, it has been found that the speed of the generator at which a motor actually first turns over or starts rotating and locks-into synchronism with the generator speed, varies a noticeable amount from the rated synchronous speed due to differences in friction etc. caused by unavoidable differences in manufacturing tolerances from motor to motor, although such motors are given identical ratings by the manufacturer. The result is that the pointer frequently moves to the "start" position, either permanently or else momentarily with flicker, before or after the engine has actually attained its "start" speed. This means that the pilot is given false and misleading information as to when his engines should be turned on for safe and proper engine performance. Moreover, in the conventional system if a failure should occur in the motor or drag-magnetic device, the engine "start" indication would fail as well as the indication of regular operating speeds for the engine.

It is an object of the invention to provide improved control apparatus.

It is another object of the invention to provide novel auxiliary means in control apparatus sensitive to various values of a variable condition for controlling the position of a member, the auxiliary means also operating to displace the controlled member in response to a value of the condition being sensed.

It is another object of the invention to provide improved control apparatus for controlling the position of a member as a function of the values of a variable condition in one range of values, auxiliary control means being provided for independently displacing, preferably in an abrupt manner, the controlled member in response to a value of the condition outside the one range.

It is another object of the invention to provide in control apparatus which includes solenoid means, novel means for holding the solenoid means in a steady-state fully actuated condition.

It is another object of the invention to provide improved apparatus for controlling the position of a displaceable member as a function of the speed of rotation of a device, the apparatus including a synchronous generator and motor and a slip-coupling device for displacing the controlled member as a function of the speed of the device for one range of speeds of the device, and auxiliary control means for imparting a predetermined different displacement to the controlled member when the device attains a different speed which is below the one range and which is less than the speed of device corresponding to the rated synchronous speed of the generator and motor.

It is a further object of the invention to provide improved tachometer apparatus including a synchronous generator and motor for indicating the operating speeds of rotation of an engine and including auxiliary means for assuring a definite indicator movement when the engine reaches its "start" speed.

It is a further object of the invention to provide improved tachometer indicating apparatus including a synchronous generator and motor for indicating the operating speeds of rotation of an engine and including auxiliary means which assures a positive indicator movement when the engine reaches its "start" speed, the "start" speed of the engine being a predetermined amount less than the engine speed which corresponds to the synchronous speed of the generator and motor.

The foregoing and other objects and advantages of the invention will appear more fully hereinafter from a consideration of the detailed description which follows, taken together with the accompanying drawing wherein one form of the invention is illustrated by way of example. It is to be expressly understood, however, that the drawing is for illustration purposes only and is not to be construed as defining the limits of the invention.

In the drawing where like reference numerals refer to like parts,

Fig. 1 is a simplified diagrammatic illustration of one form of tachometer apparatus in accordance with the invention for providing a remote indication of the speed of a turbine engine, Fig. 2 is a side elevational view partially in section of part of the indicator assembly of Fig. 1, and Fig. 3 is a view of the power actuator or solenoid 67 shown in the indicator assembly of Fig. 2.

In the drawing and description that follows by way of example the invention is embodied in a remote-indicating tachometer system for measuring and indicating the speed of an engine. It will be apparent that the invention is also applicable to the measurement or indication of other conditions. Turning to Fig. 1 there is indicated generally at 11 a gas-turbine engine having its output shaft mechanically coupled to drive the permanent magnet rotor 12 of a conventional tachometer 3-phase synchronous generator 13. If desired, a gear box 14 may be employed to change the speed ratio between the engine and the rotor 12. For example, the gearing 14 may be arranged to provide a two-to-one speed reduction from the turbine to the generator rotor. Hereinafter for purposes of discussion it will be assumed that engine 11 and rotor 12 turn at the same speed. The stator windings 15, 16 and 17 of the generator are connected back-to-back with the corresponding stator windings 18, 19 and 20 of a conventional tachometer 3-phase synchronous induction motor 21 which has an iron core rotor 22 with embedded skewed copper bars.

The shaft 23 of motor rotor 22 is mechanically coupled to drive a permanent magnet input element 25 of a conventional slip-coupling or eddy-current drag-magnet device 26 illustrated in Figs. 1 and 2. The output element of device 26 is a copper or aluminum eddy-current disc 27 which may be cup-shaped as illustrated or flat if so desired. The drag-cup device includes a stationary iron ring 24 to provide a low-reluctance return path for the flux from magnet 25. Drag cup 27 is secured to a shaft 28 supported in jewel bearings 29 and is yieldably restrained by suitable spring biasing means such as a spiral hairspring 30 having a linear deflection rate and having its inner end 31 secured to shaft 28 by being hooked into an annular groove in a hub 32 secured to shaft 28. The outer end 33 of spring 30 is maintained stationary as by soldering to a rigid arm 34 which has its rear base portion 35 held in fixed position sandwiched between a fixed stepped hub 36 and a fixed rear base member 37. Base member 37 is secured by screws 38 to a stationary frame structure 39 to which is attached a front base member 40 by screws 41. A pointer 42 is secured to the front end of shaft 28. Supported in front of base 40 by a hub 43 is a dial plate 45 for the pointer 42. Dial 45 is calibrated linearly in r.p.m. units of engine speed for the operating range, for example between 2000 and 10,000 r.p.m. Located on the dial between the zero r.p.m. position and the 2,000 r.p.m. position is the legend "START" which corresponds to the speed of the engine at which the engine ignition should be turned on for safe and proper operation of the engine. When engine 11 is at rest spring 30 biases shaft 28 and pointer 42 to their respective zero reference positions.

If it is desired to obtain a dual sensitivity for pointer 42 in the range for example between 2000 and 10,000 r.p.m. so that the pointer in either a lower or upper portion of such range provides, as compared with the remaining portion, an expanded (i.e. more sensitive) indication per unit change in engine speed, then the dial portion in question may have the space between graduations expanded and the single restraining spring 30 may be replaced by a dual spiral spring arrangement for example as disclosed in the copending application of W. W. Mumford and C. E. Petruzzi, Ser. No. 474,893, filed December 13, 1954, now Patent No. 2,855,887 and assigned to the same assignee as the present application.

Continuous rotation of the engine and generator rotor results in a rotating stator field which is repeated in the motor to induce eddy currents in the motor rotor 22. as previously indicated it will be assumed that the engine end generator rotor turn at the same speed. Let it also be assumed initially that the auxiliary control means about to be described is omitted from the system. It will also be assumed that the engine "start" speed at which the ignition should be turned on is 880 r.p.m. and that 1100 r.p.m. is the rated synchronous speed of motor 21 at which the latter finally overcomes friction, etc. and makes a complete revolution and begins continuous rotation to lock-in at the speed of the generator. At the synchronous speed the resulting rotation of the drag magnet 25 develops a turning effect or torque in the drag cup 27 which is sufficient to overcome the opposing torque exerted on shaft 28 by the bias spring 30. Hence shaft 28 and pointer 42 would be angularly displaced abruptly from zero position to a position corresponding to 1100 r.p.m. and for further increases in engine speed above 1100 r.p.m. over the rest of the engine speed range to 10,000 r.p.m., the shaft 28 and pointer 42 would have an angular position which is directly proportional to the engine speed, the torque developed in drag-cup 27 being directly proportional to the speed of motor 21 and hence also to the speed of the engine.

Auxiliary control means will now be described for displacing shaft 28 and pointer 42 abruptly from zero position to "start" position to alert the pilot when the engine reaches the "start" speed of 880 r.p.m. The provision of such means in its preferred form makes in unnecessary for the pilot to depend upon the operation of motor 21 and drag-cup device 26 in order to be informed by pointer 42 that the engine has attained a speed requiring the ignition to be turned on for safe and proper operation of the engine.

Connected across the three-phase output of generator 13 is a three-phase bridge-type full-weave rectifier network including six rectifying devices 50–55 which preferably are germanium rectifiers, although other suitable rectifying devices may be used if desired. Connected across the output of the rectifier network in series with a variable resistor 58 and a fixed resistor 59 is the control winding 60 of a sensitive solenoid 61. Solenoid 61 preferably comprises a polarized instrument-type or meter-type rotatable relay having the characteristics of a D'Arsonval meter movement. The current-sensitive control winding 60 may comprise a single coil or two coils connected in series or in parallel. The control winding may be wound on the rotor and be associated with a stator magnet. Alternatively, the control winding may be fixed and be associated with a rotor in the form of a permanent magnet vane. A fixed-coil relay of the latter type suitable for use for the present invention is the Model 219 Sensitive Relay which may be purchased from Thomas A. Edison, Inc., West Orange, New Jersey. Relay 61 includes a pair of spring contact elements 62, 63 which may be composed of platinum-iridium wire. Contact element 62 is fixed and contact element 63 is carried by the rotor shaft so that when the rectified D.C. current through winding 60 reaches a predetermined small magnitude corresponding to the engine "start" speed, for example 100 microamperes, the movable contact 63 makes electrical contact with fixed contact 62.

Upon closure of contacts 62 and 63 an energizing circuit is completed from a source 65 of D.C. voltage to the control winding 66 of a power solenoid or actuator 67. Actuator 67 preferably comprises a lever-arm type relay wherein energization of winding 66 causes armature 68 to pull in to pivot about axis A—A so as to pivot lever arm 69 abruptly about axis A—A. As shown in Fig. 2 lever arm 69 has at its outer end a bent portion 70 which engages a similar bent portion 73 of a lever 74 when armature 68 pulls in. Lever 74 is secured to or integral with a hub 75 secured to shaft 28. Initial angular adjustment of hub 75 and lever 74 on shaft 28 may be obtained by means of a set-screw 76. When armature 68 pulls in, the abrupt displacement of levers 69 and 74 produces a corresponding abrupt displacement of shaft 28 and pointer 42 from zero position. Pointer 42 is thus kicked from its zero-speed position to the engine "start" position thereby alerting the pilot that the ignition must be turned on.

Preferably, the torque exerted on shaft 28 by lever 74 upon actuation of solenoid 67 exceeds by a substantial amount the torque exerted upon shaft 28 by drag-cup 27 when the synchronous speed (1100 r.p.m.) is reached. For example, the torque exerted on shaft 28 by lever 74 upon actuation of solenoid 67 may be made equal to the torque developed by drag-cup 27 when the engine speed is 1300 r.p.m. Hence, when the engine reaches its "start" speed and the actuation of solenoid 67 kicks pointer 42 to "start" position, shaft 28 and pointer 42 will remain stationary in "start" position for further increases in engine speed until the engine speed reaches 1300 r.p.m. at which time the torque developed in drag-cup 27 will be sufficient to assume control and turn shaft 28 so that the bent portion 73 of lever 74 becomes disengaged from and leaves the bent portion 70 of the lever 69 held in space by the actuation of solenoid. For further increases in engine speed above 1300 r.p.m. lever 74 and shaft 28 are free of the influence of solenoid 67 and are controlled by the drag-cup 27, the changes in angular position of pointer 42 being directly proportional to the change in engine speed. By arranging solenoid 67 and levers 69 and 74 to exert a torque which exceeds the torque developed by drag-cup 27 at synchronous speed, troublesome pointer flicker for generator speeds in the vicinity of synchronous speed is avoided. It will be understood, however, that the torque exerted by solenoid 67 and levers 69 and 74 on shaft 28 may, if desired, be made equal to or less than drag-cup torque at synchronous speed so that the shaft and pointer remain in "start" position for engine speeds between 880 and the synchronous speed of 1100 r.p.m. and then drag-cup 27 immediately assumes control of the displacement of the shaft and pointer for further engine speed increases. It will be understood that the present invention is also applicable to engine systems where it is permissible to have the rated synchronous speed correspond to the engine "start" speed, the solenoids 61 and 67 and levers 69 and 74 being arranged to kick shaft 28 and pointer 42 from zero to "start" position in a positive manner precisely when the engine speed corresponds to the rated synchronous speed even though the motor has not yet synchronized due to frictional effects and the like and hence the drag-cup has not yet become operative to develop a torque.

If desired, a counterweight member 80 may be employed to provide balance for the assembly on shaft 28 to compensate for lack of symmetry and weight distribution of the elements on shaft 28. Member 80 has a hub portion 81 and four radial arms spaced 90° apart in one plane normal to the axis of shaft 28. Various of the arms carry a selected number of turns of heavy brass spring wire 82.

The current-sensitive relay 61 may have a drop-out characteristic wherein the contacts 62, 63 open when the current through control winding 60 falls only slightly below the pull-in value of 100 microamperes. For example, the drop-out value for relay 61 may be 98 microamperes. By employing a three-phase full-wave rectifier network to rectify all three phase voltages of the generator output the rectified current flowing through the control winding 60 of the sensitive relay 61 has an A.C. ripple component of very small amplitude and of a frequency which is six times the instantaneous frequency developed in the output of generator 13. This small amplitude and relatively high frequency is advantageous, since there is less chance that such ripple will overcome the inertia of contacts 62, 63 of the sensitive relay 61 to cause chattering of such contacts and hence a filter for removing the ripple component becomes unnecessary. This represents an important economy in the number of essential elements, since a conventional filter for removing the low frequency of the same order as the fundamental frequency generated in the output of generator 13 would of necessity be inordinately large in its physical dimensions, which could not be tolerated in many applications such as aircraft installations where weight and space considerations are critical. It is to be understood, however, that rectifiers may be arranged to rectify only one or two of the generator phase voltages for energizing control winding 60 as a function of engine speed, if so desired.

In order to insure against chattering of the relay contacts 62, 63, caused by externally produced mechanical vibration or by fluctuation in the current in winding 60 with fluctuation in engine and generator speed, the power solenoid 67 may be provided with a pair of spring contact elements 86, 87 which are held apart by electrical insulation 84 when winding 66 is deenergized. Mounted on the armature 69 is a small pusher member 88 of electrical insulation material. When solenoid 67 is energized the movement of the armature causes member 88 to push contact 87 into electrical contact with contact 86 thereby short-circuiting the series combination of resistors 58 and 59. If desired, contacts 86, 87 may be arranged instead to short-circuit only part of the total resistance of resistors 58 and 59. The resulting increase in current through winding 60 serves to hold contacts 62, 63 firmly against chatter that might otherwise occur and thus prevents intermittent deenergization of solenoid 67 and flicker of pointer 42. Closure of contacts 86, 87 may increase the current through winding 60 from 100 microamperes to 300 microamperes for example. In one construction resistor 58 was varied between 1,000 and 3,000 ohms approximately, resistor 59 was approximately 15,000 ohms and the resistance of control winding 60 was approximately 7,000 ohms. In a construction which has been found particularly suitable, solenoid 67 may comprise a type "KX" relay which may be purchased from C. P. Claire & Co., Chicago, Illinois which is modified by the addition of a lever arm similar to lever arm 69. In such construction the armature may be actuated by a current of approximately 120 milliamperes through the control winding 66.

Various modifications and applications are possible within the scope of the present invention. For example, other types of tachometer generators and motors may be employed as well as other types of slip-coupling devices and indicator arrangements. Moreover, in certain applications it may be desirable to substitute a single powerful but sensitive solenoid device in place of solenoid devices 61 and 67. Also, in certain applications it may be desirable to employ A.C. rather than D.C. type solenoid devices. Moreover, if so desired, the auxiliary control means could sense the engine "start" speed by other means such as a governor with suitable translation means for imparting the initial displacement to pointer 42.

Although certain forms of the invention and specific values etc. have been illustrated and described in detail by way of example, it is to be expressly understood that the invention is not limited thereto. Various changes may be made in the design and arrangement of parts without departing from the spirit and scope of the invention as defined by the appended claims as will now be understood by those skilled in the art.

What is claimed is:

1. Control apparatus comprising means for sensing the values of a condition which varies over a predetermined range of values, an angularly displaceable shaft, yieldable force-applying means for biasing said shaft to a reference angular position, first motor means responsive to the operation of said sensing means for applying to said shaft in opposition to the torque of said biasing means torques representative of the values of the condition in a portion of said range to displace said member angularly as a function of the values of said condition in said portion of the range, second motor means, control means responsive to a predetermined value of the condition in another portion of the range to cause operation of said second motor means independently of said first motor means, and means to releasably couple said second motor means to said shaft so as to apply to said shaft a torque in opposition to the torque of said biasing means for producing a predetermined different angular displacement of said shaft representative of said predetermined value.

2. Apparatus according to claim 1 wherein upon the occurrence of said predetermined value of the condition said control means causes said second motor means through said releasable coupling means to abruptly displace said shaft angularly from said reference position to an intermediate angular position representative of said predetermined value of the condition and said first motor means is controlled by said conditioning sensing means so as to be responsive to values of the condition greater than said predetermined value for producing additional angular displacements of said shaft beyond said intermediate angular position.

3. Tachometer apparatus for measuring the variable speed of rotation of a shaft comprising a tachometer generator rotated in accordance with the rotation of said shaft for developing output signals corresponding to the speeds of said shaft, a motor electrically coupled to the output of said generator and adapted to rotate at a speed correlated with the speed of said generator, an angularly displaceable second shaft, means for biasing said second shaft to a reference angular position, a slip-coupling device having an input member rotated by said motor and an output member for exerting upon said second shaft in opposition to the torque of said biasing means a torque substantially directly proportional to the motor speed so that the angular displacement of said second shaft corresponds to the speed of rotation of said first shaft for a predetermined range of speeds of said first shaft, auxiliary motor means, means to releasably couple said auxiliary motor means to said second shaft, said auxiliary motor means exerting through said coupling means a torque upon said second shaft, means for controlling said auxiliary motor means, said control means being responsive to a predetermined speed of said first shaft to cause said auxiliary motor means to exert upon said second shaft the last mentioned torque at said predetermined speed, and a speed indicator element angularly displaced by said second shaft.

4. Control apparatus in an engine system comprising a variable-speed device adapted for continuous rotation, a first shaft coupled to said device to rotate at a speed corresponding to the speed of said device, a tachometer generator rotated by said shaft for developing output signals corresponding to the speeds of said device, a tachometer motor electrically coupled to the output of said generator and adapted to synchronize at a predetermined speed with the speed of said generator, an angularly displaceable second shaft, a speed indicator element angularly displaced by said second shaft, yieldable force-applying means for biasing said second shaft and indicator element respectively to a reference angular position, a slip-coupling mechanism having an input member rotated by said motor and an output member for exerting upon said second shaft in opposition to the torque of said biasing means a torque corresponding to the motor speed so that angular displacement of said second shaft and indicator element corresponds to the speed of rotation of said device for speeds of said device equal to or exceeding a predetermined intermediate speed, and auxiliary means for exerting a torque upon said second shaft, said auxiliary means including motor means, means for controlling said motor means, said control means being responsive to the particular speed of said device at which it is desired to perform a particular engine operation and operative to effect energization of said motor means, means responsive to the angular displacement of said second shaft to mechanically connect said motor means to said second shaft for abruptly exerting upon said second shaft a torque in opposition to the torque of said biasing means to produce an abrupt angular movement of said shaft and indicator element respectively from said reference position to an intermediate angular position, whereby the operator is alerted that said particular engine operation should be performed.

5. Apparatus according to claim 4 wherein said motor means includes solenoid means having an armature, and releasable coupling means to mechanically connect said armature to said second shaft upon actuation of the armature on energization of the solenoid means so as to produce said abrupt angular movement of said second shaft and indicator element.

6. Apparatus according to claim 5 wherein the control means of said motor means includes a control winding operatively connected in a circuit electrically coupled with the output of said generator, said circuit including resistance means for limiting the current in said control winding so that said control means causes the energization of the solenoid means when the current in said control winding corresponds to said particular speed of the continuously rotating device, said solenoid means having an armature and contact means operative by said armature for short-circuiting at least part of said resistance means upon the energization of said solenoid means so as to hold said solenoid means in a steady-state fully actuated condition regardless of the subjecting of said solenoid means to mechanical vibration and regardless of fluctuations in the speed of said generator.

7. Apparatus according to claim 4 wherein said tachometer generator and motor are three-phase synchronous machines, the field windings of said motor being connected back-to-back with the corresponding output windings of said generator, said auxiliary means including a current-sensitive first solenoid, a second solenoid, three-phase rectifier means coupled across the output windings of said generator, an electrical network including said rectifier means and winding means of said first solenoid and resistance means for limiting the current in said winding means so that the armature of said first solenoid is actuated to close electrical contacts thereof when the rectified current in said winding means reaches a magnitude corresponding to said particular speed of the continuously rotating device, said closed contacts and winding means of said second solenoid completing an energization circuit for said last-mentioned winding means for actuating the armature of said second solenoid to couple said last-mentioned armature mechanically to said second shaft to produce said abrupt movement of said second shaft and indicator element, said second solenoid having electrical contacts adapted to be closed upon actuation of said last-mentioned armature for short-circuiting at least part of said resistance means to prevent chattering of said contacts of said first solenoid due to exposure to mechanical vibration or due to fluctuations in the speed and output signal frequency of said generator.

8. Control apparatus in an engine system comprising a variable-speed engine adapted for continuous rotation during normal operation of the system, it being desired to have the operator start the engine system when said engine attains a predetermined "start" speed, a first shaft coupled to said engine to rotate at a speed directly proportional to the speed of said engine, a three-phase synchronous tachometer generator rotated by said shaft for developing output signals corresponding to the speeds of said engine, a three-phase synchronous tachometer motor having its field windings electrically coupled back-to-back with corresponding windings of said generator and adapted to lock into synchronism with the speed of said generator when the generator is rotating at a speed which is substantially greater than the speed of the generator corresponding to said engine "start" speed, an angularly displaceable second shaft, a speed indicator element angularly displaced in accordance with the angular displacement of said second shaft, spring means for biasing said second shaft and indicator element respectively to a reference angular position, a drag-magnet slip-coupling device having an input member rotated by said motor and an output member for exerting upon said second shaft in opposition to the torque developed by said spring means a torque stubstantially directly proportional to the motor speed and to the engine speed for engine speeds substantially greater than said engine "start" speed so that for engine speeds substantially greater than said engine "start" speed the angular displacement of said second shaft and indicator element is substantially directly proportional to the engine speed, and auxiliary control means responsive to the occurrence of said engine "start" speed for abruptly exerting upon said second shaft a torque in opposition to the torque developed by said spring means to produce an abrupt initial angular displacement of said second shaft and indicator element respectively from said reference position to an intermediate angular position which indicates that the engine system should be started, said auxiliary control means including a current-sensitive first solenoid having a first winding, a first armature and first contacts, a relatively powerful second solenoid having a second winding, a second armature and second contacts, three-phase rectifier means coupled across the output windings of said generator, an electrical network including said rectifier means and said first winding and resistance means for limiting the current in said first winding so that said first armature is actuated to close said first contacts when the rectified current in said first winding reaches a magnitude corresponding to said "start" speed, the closure of said first contacts completing an energizing circuit for said second winding to actuate said second armature and close said second contacts, said second contacts being adapted upon closure to short-circuit at least part of said resistance means to increase the energizing current of said first winding to a magnitude sufficient to hold said first contacts continuously closed once said engine attains and exceeds said engine "start" speed.

References Cited in the file of this patent

UNITED STATES PATENTS

| | | |
|---|---|---|
| 1,068,111 | Crain | July 22, 1913 |
| 2,544,523 | Bogdanoff | Mar. 6, 1951 |
| 2,692,353 | Mason | Oct. 19, 1954 |
| 2,695,376 | Emms | Nov. 23, 1954 |
| 2,728,878 | Sperr | Dec. 27, 1955 |

FOREIGN PATENTS

| | | |
|---|---|---|
| 623,970 | Great Britain | May 25, 1949 |